Feb. 7, 1956 H. N. FRIHART ET AL 2,734,132

HETERODYNE RECEIVER

Filed Feb. 3, 1953 3 Sheets-Sheet 1

INVENTOR.
Henry Neil Frihart
George F. Baroch
BY
Foorman L. Mueller
Atty.

HETERODYNE RECEIVER

Filed Feb. 3, 1953 3 Sheets-Sheet 2

INVENTORS
Henry Neil Frihart
George F. Baroch
BY
Forman L. Mueller
Atty.

Feb. 7, 1956 H. N. FRIHART ET AL 2,734,132
HETERODYNE RECEIVER
Filed Feb. 3, 1953 3 Sheets-Sheet 3
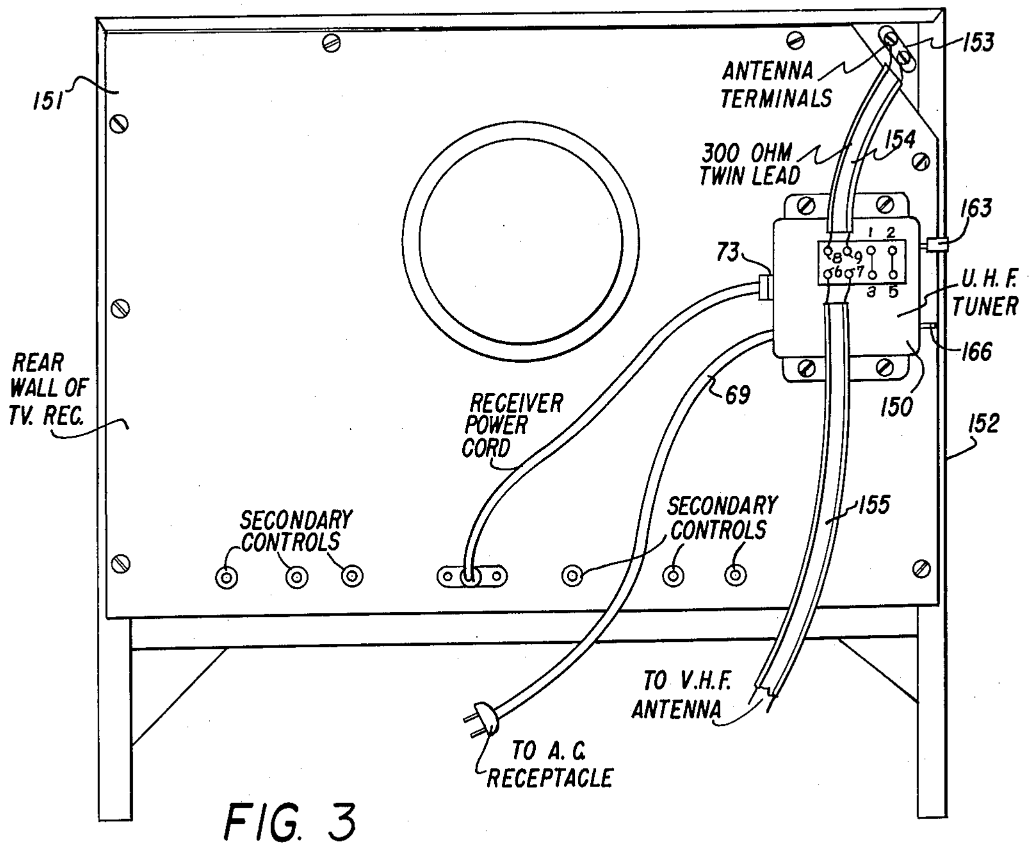
FIG. 4
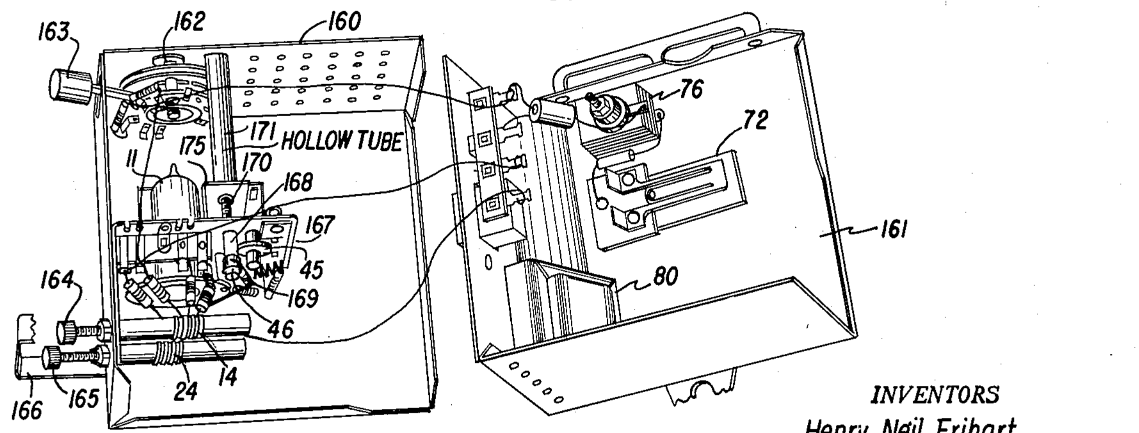
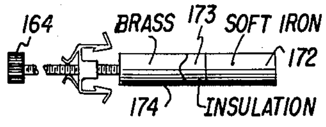
FIG. 5
INVENTORS
Henry Neil Frihart
BY George F. Baroch
Forman L. Mueller
Atty United States Patent Office 2,734,132
Patented Feb. 7, 1956

2,734,132

HETERODYNE RECEIVER

Henry Neil Frihart, Brookfield, and George F. Baroch, Lombard, Ill., assignors to Motorola, Inc., Chicago, Ill., a corporation of Illinois Application February 3, 1953, Serial No. 334,878

2 Claims. (Cl. 250—20)

Figure 1:
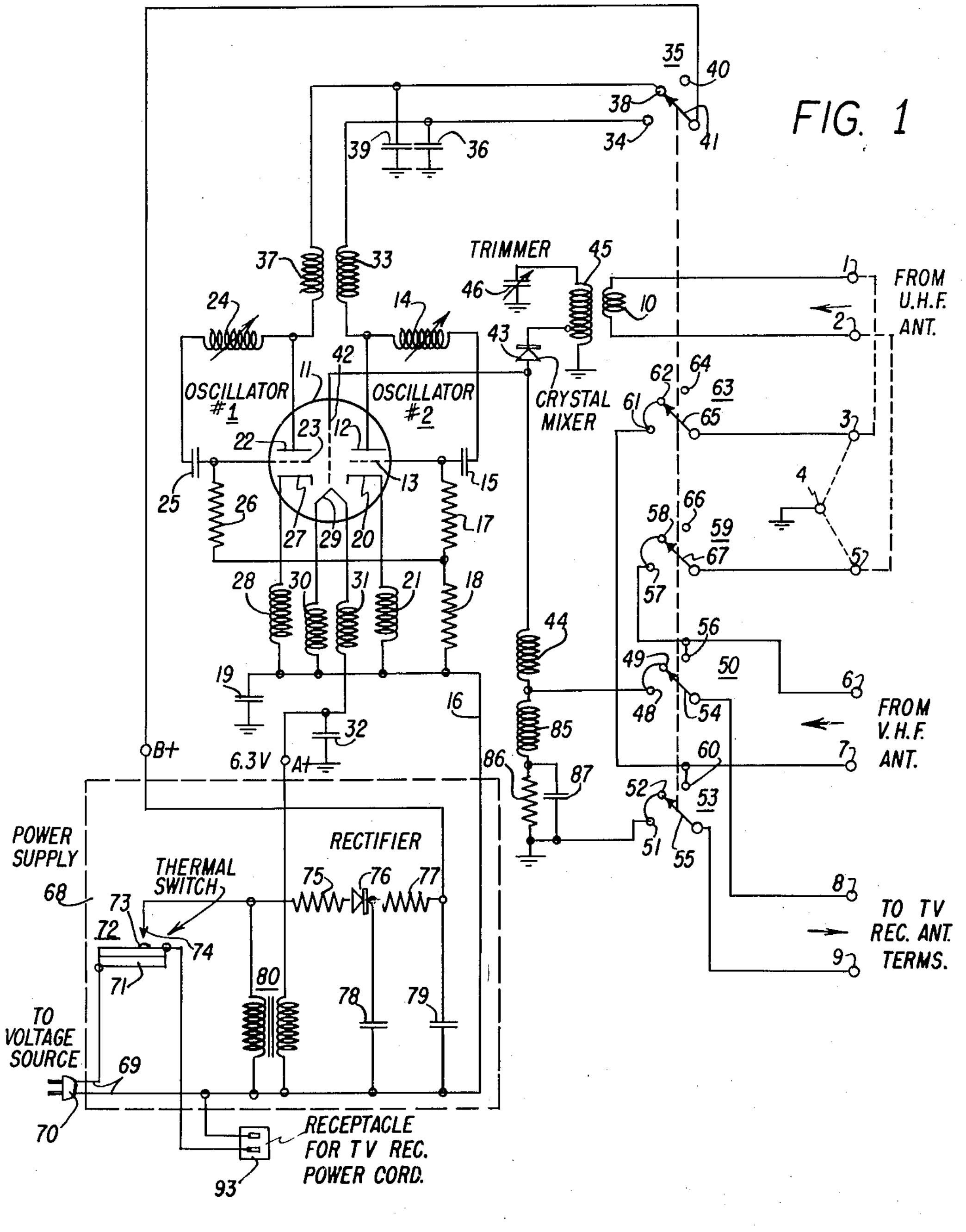

This invention relates to tuner units for use with television receivers, and more particularly to an improved ultra-high frequency tuner unit for enabling a television receiver to utilize television signals lying outside of its normal frequency range.

Most present day television receivers are constructed to utilize and reproduce television signals lying within what is termed the very high frequency band extending to 216 megacycles. Due to the great increase of television activity and the requirement for more and more television stations, the existing band is incapable of handling all the channels necessary to fulfill the contemplated future needs of many areas of the country. For this reason, the frequency band extending from 470 megacycles to 890 megacycles, which is termed the ultra-high frequency band, has been allocated to television and it is believed that in the very near future many commercial television stations will be radiating television signals on preassigned channels within this band.

The above situation has created a problem in that unless some means is provided for conveniently and economically adapting the many presently owned television receivers so that they can utilize television signals in the ultra-high frequency band, the owners of such existing receivers will be unable in the future to view a large portion of the television programs. Because of this, many devices and instrumentalities have been devised and suggested by means of which present day television receivers may be converted to utilize television signals within the ultra-high frequency band, and the present invention is directed to such a device.

It is, accordingly, an object of this invention to provide an improved tuner unit that may be conveniently and quickly connected into the circuit of an existing television receiver to enable such receiver to utilize television signals lying outside its normal frequency range.

A further object of the invention is to provide such an improved tuner unit that may be mounted on a television receiver in a relatively inconspicuous place and yet be conveniently controlled to enable the receiver to be tuned to signal channels in the ultra-high frequency band.

A still further object of the invention is to provide such an improved tuner unit which utilizes relatively few and inexpensive component parts mounted and connected together within a compact chassis, and which may be marketed at a relatively low cost.

Yet another object of this invention is to provide such an improved ultra-high frequency tuner unit for use with a television receiver which can be conveniently connected into the television receiver circuit without impairing or disturbing any of its internal circuit connections.

A feature of the invention is the provision of an ultra-high frequency tuner which has its own power source, and which may be connected effectively in series with the power energizing leads of the television receiver and in series with the lead-in conductors from the receiver antenna.

Another feature of the invention is the provision of such an improved tuner unit that is readily adaptable for use with a single V. H. F. antenna or for use with separate V. H. F. and U. H. F. antennas.

Yet another feature of the invention is the provision of an ultra-high frequency tuner which includes an antenna circuit that may be tuned to accept simultaneously to two or more signals in the U. H. F. band, and which also includes a plurality of heterodyne oscillator circuits that may each be tuned sharply to a different resonant frequency so that a selected intermediate frequency signal may be derived from each of the signals accepted by the antenna circuit.

Figure 2:
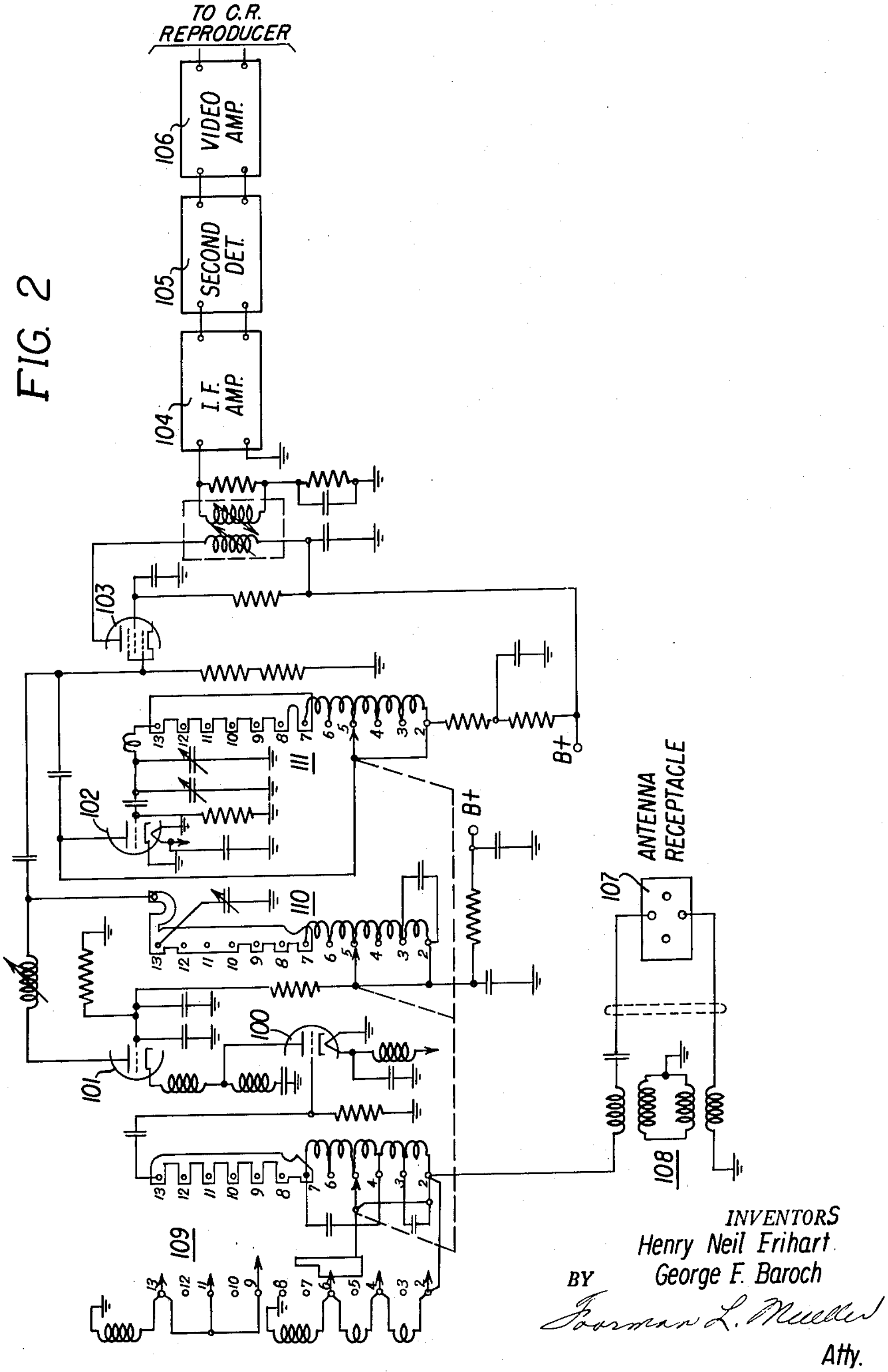

The above and other features of the invention which are believed to be new are set forth with particularity in the appended claims. The invention itself, however, together with further objects and advantages thereof, may best be understood by reference to the following description when taken in conjunction with the accompanying drawings in which:

Fig. 1 shows a circuit diagram of the ultra-high frequency tuner of the invention, Fig. 2 is a schematic representation of a portion of a typical television receiver suitable for conversion by the tuner unit of the invention, Fig. 3 shows a convenient mounting arrangement of the tuner on a television receiver, Fig. 4 is a mechanical representation of the tuner unit, and Fig. 5 shows a tuning core utilized in the U. H. F. tuner of the invention.

The ultra-high frequency tuner unit of the present invention is, as previously noted, intended for use with a television receiver for enabling such receiver to utilize at least one television signal outside the normal frequency range of the receiver. The receiver has an input circuit capable of being rendered selective to a predetermined signal frequency and it also has a power cord for supplying electrical energy to the receiver. The tuner comprises an antenna circuit for receiving television signals in the ultra-high frequency band which is outside the normal frequency range of the receiver, and at least one oscillator section for producing a heterodyne signal of a selected frequency. A mixer circuit is coupled to the antenna circuit and to the oscillator for heterodyning a selected television signal within the ultra-high frequency band to the predetermined signal frequency at which the input circuit of the receiver is rendered selective. A power supply is provided for supplying energy to the oscillator, and the power supply is connected to an energizing source by means of suitable conductor means. Finally, an electrical receptacle is connected to the conductor means for receiving the power cord of the television receiver effectively to connect the cord to the energizing source.

With reference now to Fig. 1, the improved ultra-high frequency tuner unit of the invention comprises an antenna circuit including an inductance coil 10 connected to a first pair of input terminals 1 and 2, the input terminals being adapted to be connected to the lead-in conductors from an ultra-high frequency antenna. The tuner unit also incorporates a pair of oscillator sections including respectively the triode sections of a double triode 11 which, for example, may be of the type known and identified as 6BZ7. The first triode section of device 11 has an anode 12 coupled to its control electrode 13 through a variable inductance coil 14 and capacitor 15, control electrode 13 being connected to a reference potential lead 16 through series-connected resistors 17, 18, and reference potential lead 16 being bypassed to ground through a capacitor 19. The cathode 20 of this triode section is connected to lead 16 through a choke coil 21.

The second triode section of device 11 has an anode 22 coupled to control electrode 23 through a variable inductance coil 24 and capacitor 25, the control electrode being connected to the junction of resistors 17 and 18 through a resistor 26. The cathode 27 of this section is connected to lead 16 through a choke coil 28. The heater 29 of device 11 is connected to lead 16 through a choke coil 30 and to terminal A+ through a choke coil 31, the junction of choke coil 31 and terminal A+ being bypassed to ground through a capacitor 32.

Anode 12 of the first triode section of device 11 is also connected through a choke coil 33 to a contact 34 of a switch 35, contact 34 being bypassed to ground through a capacitor 36. Anode 22 of the other triode section of device 11 is connected through a choke coil 37 to a contact 38 of switch 35, contact 38 being bypassed to ground through a capacitor 39. Switch 35 has an open contact 40, and also has a movable arm 41 which is connected to the terminal B+.

Device 11 has an output electrode 42 which receives the oscillations from the first and second oscillator sections, output electrode 42 being connected to the junction of a crystal mixer 43 and an inductance coil 44. Mixer 43 is connected to a tap on an inductance coil 45 which is inductively coupled to inductance coil 10 and which has one side connected to ground and the other side coupled to ground through a variable trimmer capacitor 46. Inductance coil 44 is connected to ground through a further inductance coil 85 and a resistor 86, the latter being shunted by a capacitor 87.

The junction of inductance coils 44 and 85 is connected to contacts 48 and 49 of a switch 50, whereas the contacts 51 and 52 of a switch 53 are connected to ground. The moving arm 54 of switch 50 and the moving arm 55 of switch 53 are connected respectively to the output terminals 8 and 9 of the tuner, the output terminals being adapted to be connected to the antenna terminals of the television receiver.

The tuner unit has a further pair of input terminals 6 and 7 which are adapted to be connected to the very high frequency antenna of the receiver, terminal 6 being connected to a contact 56 of switch 50 and to contacts 57 and 58 of a switch 59, and terminal 7 being connected to a contact 60 of switch 53 and to contacts 61 and 62 of a switch 63. Switch 63 has an open contact 64 and a movable arm 65, the latter being connected to terminal 3. Switch 59 has an open contact 66 and a movable arm 67, the latter being connected to terminal 5. Terminals 3 and 5 constitute jumper terminals for the tuner unit and, for reasons to be described, may be connected either to input terminals 1 and 2 when a single V. H. F. antenna is to be used for both V. H. F. and U. H. F. reception, and which may be shorted together and connected to ground terminal 4 when separate V. H. F. and U. H. F. antennas are used.

The tuner unit of the invention also includes a power supply which is shown enclosed by the dashed lines 68. The power supply includes a pair of conductors 69 which are adapted to connect the power supply to a usual 60 cycle 110-volt alternating current receptacle by means of a plug 70. One of the conductors 69 is connected to the lead 16 referred to previously as the reference potential lead, and the other conductor is connected through the energizing element 71 of a thermal switch 72 to one contact of a receptacle 93, receptacle 93 being used to receive the energizing cord of the television receiver and having its other contact directly connected to lead 16.

Thermal switch 72 has a pair of normally open contacts 73, 74; contact 73 being connected to one of the conductors 69, and contact 74 being connected to the aforementioned terminal B+ through resistor 75, rectifier 76 and resistor 77. The junction of rectifier 76 and resistor 77 is coupled to lead 16 through a filter capacitor 78 and terminal B+ is coupled to lead 16 through a further filter capacitor 79. A filament transformer 80 is included in the power supply having its primary winding connected between contact 74 and lead 16 and its secondary winding connected between the terminal A+ and that lead.

It is evident that when the energizing element 71 of thermal switch 72 has current passing therethrough so as to close contacts 73 and 74, an energizing unidirectional potential is established between terminal B+ and lead 16 of, for example, 155 volts; and an alternating current potential is established between terminal A+ and lead 16 of, for example, 6.3 volts. The current flow through energizing element 71 of thermal switch 72 is controlled by the television receiver so that only when the receiver is turned on and drawing current through its power cord are contacts 73 and 74 closed so as to energize the power supply and activate the tuner. In this fashion, the on-off switch of the television receiver also controls the tuner unit, the unit being on only when the on-off switch of the receiver is on.

When the moving arm 41 of switch 35 connects with contact 38, the first oscillator section of discharge device 11 is energized and supplies oscillations to the mixer circuit of crystal 43. On the other hand, when the movable arm of switch 35 connects with contact 34 the second oscillator section of device 11 is energized supplying oscillations to the mixer circuit. Finally, when the movable arm 41 of switch 35 connects with contact 40, neither of the oscillator sections are energized.

It will be assumed for the purpose of the succeeding description that the movable arm 41 of switch 35 is first adjusted to connect with contact 38 causing the first oscillator section to be energized. The various switches 35, 63, 59, 50, 53 are mechanically coupled for uni-control so that when arm 41 connects with contact 38, arm 65 connects with contact 62, arm 67 connects with contact 58, arms 54 connects with contact 49, and arm 55 connects with contact 52. The inductance coil 10 receives television signals in the ultra-high frequency band and these signals are induced into the circuit of coil 45 and trimmer 46 and applied to crystal mixer 43, trimmer 46 being adjusted so that the circuit 45, 46 accepts a selected two adjacent signals in the U. H. F. band for application to the mixer. The frequency of the first oscillator section is adjusted by varying inductance coil 24 so that the energized oscillator section supplies a heterodyning signal to the mixer circuit of such a frequency that one of the ultra-high frequency television signals selected from antenna circuit 10 by network 45, 46 is heterodyned in the mixer to a predetermined intermediate frequency, the heterodyned U. H. F. television signal appearing across network 85—87 to be supplied through contacts 49 and 52 and movable arms 54 and 55 to output terminals 8 and 9 connected to the antenna terminals of the television receiver.

The input terminals 6 and 7, which are connected to the very high frequency antenna of the receiver, are connected through contacts 62 and 58 and movable arms 65 and 67 to jumper terminals 3 and 4. The jumper terminals, where separate V. H. F. and U. H. F. antennas are used, are connected together and to ground terminal 4 so that when the switches are in the above described position, the V. H. F. antenna is shorted and not in use. However, in the event that the V. H. F. antenna is also to be used for U. H. F. reception, jumper terminals 3 and 5 are respectively connected to input terminals 1 and 2 (instead of being short circuited to ground) so that the U. H. F. signals received by the V. H. F. antenna are supplied to antenna circuit 10.

When the switches are moved one step in an anticlockwise direction from the previously described position, the circuit remains essentially unchanged with the exception that the second oscillator section rather than the first oscillator section is energized so that the other ultra-high frequency signal selected by network 45, 46 may be heterodyned to the aforementioned predetermined intermediate frequency and applied to the antenna terminals of the receiver by output terminals 8 and 9.

When the switches are turned in a clockwise direction from the central position, however, movable arm 41 connects with terminal 40 and both oscillators are deenergized, movable arms 65 and 67 connect with open contacts 64 and 66 so that the jumper terminals are disconnected from the circuit, and movable arms 54 and 55 connect contacts 56 and 60 so that input terminals 6 and 7 are connected directly to output terminals 8 and 9. In this position of the switches, the tuner unit is not in use and the V. H. F. antenna is connected directly to the television receiver to allow for normal V. H. F. television reception.

The receiver of Fig. 2 which is intended to represent a typical television receiver includes a pair of cascode connected radio-frequency amplifiers 100 and 101 and an oscillator 102, amplifier 101 and oscillator 102 being coupled to a heterodyne mixer 103. The mixer, in turn, is coupled to an intermediate frequency amplifier 104 which is connected to a second detector 105 having output terminals connected to a video amplifier 106. The video amplifier is connected to the usual cathode-ray image reproducing device (not shown) to supply the detected composite video signal to the reproducer. The sound and scanning circuits of the receiver are not necessary to explain the operation of the invention and, for that reason, have not been shown.

The output terminals 8 ad 9 of the tuner unit of Fig. 1 are connected to the antenna receptacle 107 which is connected through an antenna circuit 108 to a tuning means 109. The tuning means 109 tunes the input circuit of amplifier 100 selectively to various signal channels within the very high frequnecy band. Tuning means 109 is mechanically coupled to a further tuning means 110 which concurrently tunes the output circuit of the radio-frequency amplifier to the various signal channels within the very high frequency band. In addition, the tuning means 109 and 110 are mechanically connected to a tuning means 111 which operates concurrently therewith to adjust the frequency of oscillator 102 so that it produces a heterodyning signal for heterodyning the various television signals amplified by the radio-frequency amplifier to the selected intermediate frequency of the receiver.

For normal, very high frequency reception, the tuning means 109, 110 and 111 are set to any selected signal channel, and the television signal corresponding to this channel is amplified in the radio-frequency amplifiers 100 and 101, and heterodyned to the predetermined intermediate frequency of the receiver in mixer 103. The resulting intermediate frequency signal is amplified in amplifier 104 and detected in detector 105 to produce a composite video signal. The latter signal is amplified in video amplifier 106 and applied to the image reproducer in known fashion.

For ultra-high frequency reception, the tuners 109, 110 and 111 are set to a selected channel, and the first and second oscillator sections of the tuner of Fig. 1 are adjusted so that the two ultra-high frequency signals selected by the tuner are heterodyned in each instance to a predetermined frequency corresponding to the abovementioned selected signal channel to which the receiver of Fig. 2 is adjusted. In this fashion, output terminals 8 and 9 apply a first intermediate-frequency signal to antenna receptacle 107 corresponding to one or the other of the ultra-high frequency signals depending upon which oscillator section is energized, and this first intermediate-frequency signal is amplified in amplifiers 100, 101 and again heterodyned in mixer 103 to a second intermediate frequency corresponding to the predetermined intermediate frequency of the receiver for amplification in intermediate-frequency amplifier 104, detection in detector 105, and subsequent amplification in video amplifier 106 and reproduction in the image reproducer of the receiver.

As shown in Fig. 3, the ultra-high frequency tuner of the present invention which is designated as 150 may be conveniently secured to the rear wall 151 of a television receiver 152 in the proximity of its antenna input terminals 153. It is preferable that the tuner unit be mounted within 10 inches of terminals 153. The receiver power cord, instead of being connected into a 60 cycle 115-volt receptacle is plugged into receptacle 93 of the tuner, whereas conductors 69 of the tuner are plugged into the aforementioned receptacle. Output terminals 8 and 9 of the tuner are connected to antenna terminals 153 by means of a well-known 300 ohm twin lead 154, whereas, input terminals 6 and 7 of the unit are connected to the lead-in 155 from the V. H. F. antenna of the receiver. In this instance it is assumed that the V. H. F. antenna is to be used for both V H. F. and U. H. F. reception and to that end jumper terminals 3 and 5 are connected respectively to terminals 1 and 2. However, as pointed out previously, when a separate U. H. F. antenna is to be used, its lead-in is connected to terminals 1 and 2 and terminals 3 and 5 are connected together and grounded.

As shown in Fig. 4, the ultra-high frequency tuner of the invention is compactly mounted on a casing having two sections 160 and 161. Switching means 35, 63, 59, 50, 53 takes the form of a well-known bank of rotary switches 162 secured to one wall of casing section 160, switch bank 162 being actuated to each one of its three positions by an actuating arm 163 extending through a side of the casing. Variable inductance coils 14 and 24 in the frequency determining circuits of the oscillator sections are conveniently mounted on the casing and have controls 164 and 165 extending through the casing. Adjustment of these controls alters the position of tuning slugs within inductance coils 14 and 24 to vary their inductive values and the frequencies of their corresponding oscillator sections. The tuning slugs may have the configuration shown in Fig. 5, and may each comprise a section 172 of soft iron or equivalent material, an insulated section 173, and a section 174 of brass or equivalent material. With the illustrated construction, the section 172 increases the inductance of the coils whereas the section 174 decreases the inductance due to eddy current flow. In this fashion, coils 14 and 24 may be tuned through a wide inductive range so that the frequency of each oscillator section may be adjusted to heterodyne any selected signal within the U. H. F. band.

As shown in Fig. 3, control 163 conveniently extends to the edge of the receiver to be inconspicuous yet accessible for easy manipulation. Controls 164 and 165 are surrounded by a shield 166 and also extend to the edge of the receiver from the side of the tuning unit to be readily accessible for control purposes.

Discharge device 11 is mounted on a transverse base 167 extending from casing section 160, and the base also supports trimmer condenser 46. The trimmer condenser comprises a dielectric tube 168 secured to the underside of the base, and the tube has a conductive strip 169 wrapped around its outer surface to constitute one electrode of the condenser. Tube 168 has internal threads to receive a stud 170 which constitutes the other electrode of the condenser and is grounded to base 167, the stud being supported by a bracket 175 on the other side of base 167 and extending through a hollow tube 171 for external adjustment through casing section 160. In this fashion, adjustment of stud 171 tunes network 45, 46 to accept any two adjacent signals in the U. H. F. band from antenna circuit 10, the former network having a sufficiently low quality factor to accept two such signals simultaneously.

The invention provides, therefore, an extremely simple and compact and relatively inexpensive ultra-high frequency tuner unit that may be conveniently mounted in an inconspicuous yet accessible position on a television receiver. Moreover, the ultra-high frequency tuner may be connected into the receiver circuit in a simple and expedient manner without the necessity of disturbing any of the internal wiring of the receiver.

While a particular embodiment of the invention has been shown and described, modifications may be made, and it is intended in the appended claims to cover all such modifications as fall within the true spirit and scope of the invention.

We claim:

1. An ultra-high frequency tuner unit for use with a television receiver for enabling such receiver to utilize at least one television signal outside the normal frequency range of the receiver, said receiver having an input circuit capable of being rendered selective to a predetermined signal frequency and further having a power cord for supplying electrical energy to the receiver, said tuner including in combination, an antenna circuit for receiving television signals in a high frequency range outside the normal frequency range of the television receiver, at least one oscillator section for producing a heterodyne signal of a selected frequency, a mixer circuit coupled to said oscillator and to said antenna circuit for heterodyning a selected television signal within the aforesaid frequency range to the predetermined signal frequency at which the input circuit of the receiver is rendered selective, a power supply for supplying energy to said oscillator, a pair of conductors for connecting said power supply to an energizing source, a thermal switch having an energizing element and further having a pair of normally open contacts in circuit with one of said conductors, and an electrical receptacle connected directly to one of said conductors and through said energizing element to the other of said conductors for receiving the aforesaid power cord of the television receiver effectively to connect such cord to the energizing source, whereby current flow through said cord causes said energizing element to close the aforesaid contacts of said thermal switch thereby energizing said power supply.

2. An ultra-high frequency tuner unit for use with a television receiver for enabling such receiver to utilize two distinct television signals outside the normal frequency range of the receiver, said receiver having an input circuit capable of being rendered selective to a predetermined signal frequency and further having a power cord for supplying electrical energy to the receiver, said tuner including in combination, a first pair of input terminals adapted to be connected to an ultra-high frequency antenna, a second pair of input terminals adapted to be connected to a very high frequency antenna, a pair of jumper terminals, a pair of output terminals adapted to be connected to the aforesaid input circuit of the television receiver, an antenna circuit connected to said first pair of input terminals for receiving television signals in a high frequency range outside the normal frequency range of the television receiver, a pair of oscillator sections each producing a heterodyne signal of a different selected frequency, a mixer circuit coupled to said antenna circuit and to said oscillators for heterodyning each of two selected television signals within the aforesaid high frequency range to the predetermined frequency at which the input circuit of the receiver is rendered selective, a power supply for supplying energy to said oscillator, a pair of conductors for connecting said power supply to an energizing source, a thermal switch having an energizing element and further having a pair of normally open contacts in circuit with one of said conductors, an electrical receptacle connected directly to one of said conductors and through said energizing element to the other of said conductors for receiving the aforesaid power cord of the television receiver effectively to connect such cord to the energizing source, and switching means having a first position for energizing one of said oscillator sections and having a second position for energizing the other of said oscillator sections and having a third position for deenergizing both of said oscillator sections, said switching means connecting said second pair of input terminals to said jumper terminals and said output terminals to said mixer in its first and second positions and connecting said second pair of input terminals to said output terminals in its third position.

References Cited in the file of this patent

UNITED STATES PATENTS

| | | |
|---|---|---|
| 2,218,501 | Andrews | Oct. 22, 1940 |
| 2,383,322 | Koch | Aug. 21, 1945 |
| 2,598,857 | Sziklai | June 3, 1952 |

OTHER REFERENCES

UHF Converter Design Features, pp. 37, 38, 63 and 64, September 1951, issue of Tele-Tech.

UHF Circuitry, pp. 57–59 of Radio Electronics, vol. XXIV, issue 1, January 1953.